United States Patent Office 2,855,394
Patented Oct. 7, 1958

2,855,394
METALLISABLE MONOAZO DYESTUFFS AND COMPLEX HEAVY METAL COMPOUNDS THEREOF

Hans Ackermann, Riehen, near Basel, and Guido Schetty, Basel, Switzerland, assignors to J. R. Geigy A. G., Basel, Switzerland, a Swiss firm No Drawing. Application February 8, 1956
Serial No. 564,105

Claims priority, application Switzerland February 23, 1955

9 Claims. (Cl. 260—149)

The present invention concerns metallisable monoazo dyestuffs, the complex heavy metal compounds thereof, processes for their production and use for the fast dyeing of natural and synthetic organic material, in particular for the dyeing of natural and synthetic polypeptide material.

It has been found that valuable metallisable monoazo dyestuffs are obtained if a benzene diazonium compound containing in the o-position to the diazo group a hydroxyl group or a substituent which can be converted into a hydroxyl group and which otherwise can be further substituted, for example by halogen, alkyl, acylamino, sulphonic acid, alkyl sulphonyl, sulphonic acid amide and, advantageously, by a nitro group, is coupled with a 4-methyl-1-hydroxybenzene compound which is substituted in the 2- and 5-positions by an acylamino and a methyl group.

In the form of their heavy metal complexes, the new monoazo dyestuffs produce fast red brown, brown to brown violet dyeings on natural or synthetic polypeptide fibres. The metallisation can be performed either during or after dyeing, e. g. according to the single bath chroming method or by the after chroming method; it is often more advantageous to metallise in substance before dyeing. Particularly suitable for the dyeing of natural or synthetic polypeptide fibres such as wool, silk, superpolyamide and superpolyurethane fibres from a weakly alkaline, neutral to weakly acid liquor in fast red brown, brown to brown violet shades are those complex chromium and cobalt compounds which contain two unsulphonated dyestuff molecules bound to one heavy metal atom. Advantageously they are used in the form of their alkali salts, for example in the form of the lithium, sodium, potassium or ammonium salts, in the presence of anion active wetting and dispersing agents in a neutral to weakly acid bath.

The following diazo components are suitable, for example, for the production of monoazo dyestuffs according to the present invention: 4-nitro-2-amino-1-hydroxybenzene, 4 - nitro - 6 - methyl - 2 - amino - 1 - hydroxybenzene, 4 - nitro - 6 - chloro - 2 - amino - 1 - hydroxybenzene, 4 - nitro - 2 - amino - 1 - hydroxybenzene - 6 - sulphonic acid dimethyl- or -diethyl amide, 4-nitro-6-methyl sulphonyl- or 4-nitro-6-ethyl sulphonyl- or 4-nitro-6-butyl sulphonyl- 2-amino-1-hydroxybenzene, 4-nitro-6-carbethoxy - amino - 2 - amino - 1 - hydroxybenzene, 6 - nitro- 4 - methyl - 2 - amino - 1 - hydroxybenzene, 6 - nitro - 4- tert. butyl - 2 - amino - 1 - hydroxybenzene, 6 - nitro- 4 - acetylamino - 2 - hydroxybenzene, 4 - nitro - 2 - amino- 1 - methoxybenzene, 6 - nitro - 4 - chloro - 2 - amino - 1- hydroxybenzene, 5 - nitro - 2 - amino - 1 - hydroxybenzene, 5 - nitro - 4 - chloro - 2 - amino - 1 - hydroxybenzene, 5 - nitro - 4 - methyl - 2 - amino - 1 - hydroxybenzene, 4-chloro - 2 - amino - 1 - hydroxybenzene, 4.6 - dichloro- 2 - amino - 1 - hydroxybenzene, 4 - nitro - 2 - amino - 1- hydroxybenzene - 6 - sulphonic acid, 6 - nitro - 2 - amino- 1 - hydroxybenzene - 4 - sulphonic acid, 4 - chloro - 2- amino - 1 - hydroxybenzene - 6 - sulphonic acid, 6- chloro - 4 - methyl sulphonyl - 2 - amino - 1 - hydroxybenzene.

Monoazo dyestuffs according to the present invention which are obtained from a 4-nitro-2-amino-1-hydroxybenzene compound which may only possibly be substituted in the 6-position by halogen, an alkyl, an acylamino, an alkyl sulphonyl, a sulphonic acid amide or sulphonic acid group, are particularly valuable.

4-methyl-1-hydroxybenzene coupling components used according to the present invention are new which are substituted in the 2- and 5-positions by a methyl and an acylamino group, the one of these two groups taking the o- and the other the m-position to the hydroxyl group. They are easily obtained either by coupling 3.4-dimethyl-1-hydroxybenzene with an aryl diazonium compound, reduction of the monoazo dyestuff obtained while isolating the 1-hydroxy-3.4-dimethyl-6-aminobenzene and acylating, or by mononitrating 2.4-dimethyl-1-aminobenzene in concentrated sulphuric acid to form 1-amino-2.4-dimethyl-5-nitrobenzene, diazotising the amino group while boiling down the diazonium group to the hydroxyl group, reducing the nitro group to the amino group and acylating.

Advantageously radicals of lower fatty acids are used as acyl radicals of the acylamino group of the azo component, for example the acetyl, propionyl, chloracetyl, methoxyacetyl, β-bromopropionyl radical, also radicals of lower alkyl sulphonic acids and aryl sulphonic acids, e. g. the methyl sulphonyl, chloromethyl sulphonyl, ethyl sulphonyl and toluene sulphonyl radical, as well as radicals of carbonic acid monoesters with lower alcohols, e. g. the carbomethoxy, carbethoxy, carbomethoxyethoxy, carbethoxyethoxy radical. The azo components usable according to the present invention have relatively good coupling power so that generally the yield from the azo coupling is from technically satisfactory to very good. The azo coupling is performed in an alkaline medium, often advantageously in the presence of magnesium oxide, calcium hydroxide and/or of water soluble tertiary nitrogen bases such as pyridine, triethylamine, methyl or ethyl diethanolamine, triethanolamine.

The monoazo dyestuffs according to the present invention are metallised in substance by treatment with agents giving off chromium or cobalt, advantageously in aqueous solution or suspension in the warm, open or under pressure. Often the use of alkali chromosalicylates for the chroming and of cobalto salts for the cobalting, the medium having an alkaline reaction, is advantageous. Unsulphonated o-alkoxy azo dyestuffs are metallised while exchanging the alkoxy for the hydroxyl group advantageously in organic solution at raised temperatures. For example they are metallised with chromic salts at 120–160° C. in formamide or alkylene glycol. In the process according to the present invention, the monoazo dyestuffs according to the present invention themselves or mixtures thereof or mixtures with other unsulphonated o. o'-dihydroxy- or o-carboxy- o'-hydroxyazo dyestuffs can be metallised.

The alkali salts of the particularly valuable complex chromium and cobalt compounds according to the present invention consisting of two unsulphonated dyestuff molecules and one heavy metal atom are generally sufficiently water soluble in hot water in the presence of anion active wetting and dispersing agents to be dyed from a neutral to weakly acid bath. According to their composition and the heavy metal atom bound in complex linkage, they dye wool and superpolyamide or superpolyurethane fibres in brown violet, dark brown to brown red shades which are distinguished by their good to very good fastness to light.

The following examples serve to illustrate the subject matter of the invention without limiting it in any way. Where not otherwise stated, parts are given as parts by weight and the temperatures are in degrees centigrade. Where parts by volume are expressly mentioned, their relationship to parts by weight is as that of litres to kilogrammes.

EXAMPLE 1

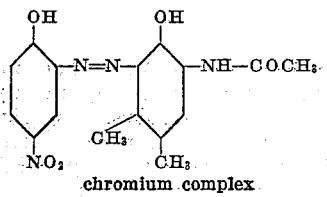

chromium complex 15.4 parts of 4-nitro-2-amino-1-hydroxybenzene are diazotised in the usual way. The excess acid is buffered with sodium bicarbonate and the paste of the yellow diazoxide is poured into a solution of 18.8 parts of 2-acetylamino-4.5-dimethyl-1-hydroxybenzene, 150 parts of water, 4.2 parts of sodium hydroxide and 12 parts of anhydrous sodium carbonate which has been cooled to 5°. Sufficient pyridine is added to obtain a 20% solution and the whole is stirred at 0-5° until the dyestuff formation is complete. Hydrochloric acid is then added to the coupling mixture until it has an acid reaction to Congo red paper and the precipitated dyestuff is filtered off. To purify, it is pasted in hot water and converted with sodium carbonate into the sodium salt. This is completely separated by the addition of sodium chloride and it is filtered off. It dyes wool according to the single bath chroming method in fast brown shades.

The damp dyestuff is pasted in 600 parts of hot water and boiled under reflux with 120 parts of a solution of sodium chromo salicylate, corresponding to 3.1 parts of chromium, until all the starting dyestuff has disappeared. The chromium containing dyestuff is completely precipitated by the addition of sodium chloride and filtered off. It dissolves in hot water and dyes wool from a neutral to weakly acid bath in very fast brown shades.

Similar dyestuffs are obtained if 18.9 parts of 6-chloro-4-nitro-2-amino-1-hydroxybenzene or 16.8 parts of 6-methyl-4-nitro-2-amino-1-hydroxybenzene are used instead of 4-nitro-2-amino-1-hydroxybenzene.

EXAMPLE 2

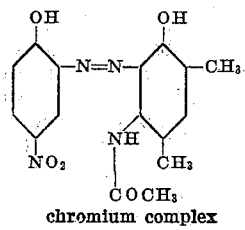

chromium complex 15.4 parts of 4-nitro-2-amino-1-hydroxybenzene are diazotised in the usual manner. The paste of the diazoxide, neutralised with sodium bicarbonate, is poured into a solution of 18.8 parts of 5-acetylamino-2.4-dimethyl-1-hydroxybenzene, 4.2 parts of sodium hydroxide and 12 parts of anhydrous sodium carbonate in 150 parts of water. After adding sufficient pyridine to make a 30% solution, the whole is stirred at 0-5° until the dyestuff formation is complete. Hydrochloric acid is added until the reaction is acid to Congo red paper, the precipitated dyestuff is filtered off and purified by conversion into the sodium salt. It dyes wool according to the single bath chroming method in fast brown shades.

The damp dyestuff in 600 parts of hot water is boiled under reflux with 120 parts of a solution of sodium chromo salicylate, corresponding to 3.1 parts of chromium, until the metallisation reaction is complete. On the addition of sodium chloride the chromium containing dyestuff is completely precipitated and then filtered off. It dissolves in hot water and dyes wool from a weakly acid bath in fast brown shades.

EXAMPLE 3

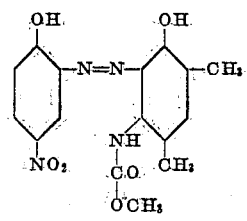

cobalt complex 38.2 parts of the sodium salt of the metal free dyestuff produced according to Example 2 from diazotised 4-nitro-2-amino-1-hydroxybenzene and 20.5 parts of 5-carbomethoxyamino-2.4-dimethyl-1-hydroxybenzene are pasted in 600 parts of water and heated for 1 hour at 80–90° with 60 parts of a cobalt acetate solution, corresponding to 3.54 parts of cobalt. The metallisation mixture is then made phenolphthalein alkaline with sodium carbonate and, after stirring for 2 hours at 80–90°, the dyestuff is completely precipitated by the addition of sodium chloride and filtered off. It dissolves in hot water and dyes wool from a weakly acid bath in red brown shades which have excellent fastness to light.

The following Table I contains further monoazo dyestuffs according to the present invention containing heavy metal which are produced according to the methods described in Examples 1 to 3.

*Table I*

| No. | Diazo component | Azo component | Metal | Shade on wool |
|---|---|---|---|---|
| 1 | 4-nitro-2-amino-1-hydroxybenzene | 2-carbomethoxyamino-4.5-dimethyl-1-hydroxybenzene | Cr | brown. |
| 2 | do | 2-acetylamino-4.5-dimethyl-1-hydroxybenzene | Co | Do. |
| 3 | do | 5-propionylamino-2.4-dimethyl-1-hydroxybenzene | Co | red brown. |
| 4 | 4-nitro-6-chloro-2-amino-1-hydroxybenzene | 5-acetylamino-2.4-dimethyl-1-hydroxybenzene | Cr | brown. |
| 5 | 4-nitro-6-methyl-2-amino-1-hydroxybenzene | do | Cr | Do. |
| 6 | 6-nitro-4-chloro-2-amino-1-hydroxybenzene | do | Cr | brown violet. |
| 7 | 4-chloro-2-amino-1-hydroxybenzene | do | Cr | Do. |
| 8 | do | 5-carbomethoxyamino-2.4-dimethyl-1-hydroxybenzene | Co | reddish brown violet. |
| 9 | 5-nitro-2-amino-1-hydroxybenzene | 5-acetylamino-2.4-dimethyl-1-hydroxybenzene | Cr | grey violet. |
| 10 | 4-nitro-2-amino-1-hydroxybenzene | 2-propionylamino-4.5-dimethyl-1-hydroxybenzene | Cr | brown. |
| 11 | do | 5-carbethoxyamino-2.4-dimethyl-1-hydroxybenzene | Cr | Do. |
| 12 | 4-nitro-6-methyl-2-amino-1-hydroxybenzene | do | Co | red brown. |
| 13 | 4-nitro-2-amino-1-hydroxybenzene | 5-carbomethoxyamino-2.4-dimethyl-1-hydroxybenzene | Cr | brown. |
| 14 | 6-acetylamino-4-nitro-2-amino-1-hydroxybenzene | 5-acetylamino-2.4-dimethyl-1-hydroxybenzene | after chromed | Do. |
| 15 | do | 2-acetylamino-4.5-dimethyl-1-hydroxybenzene | do | Do. |

EXAMPLE 4

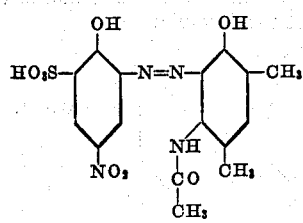

23.4 parts of 4-nitro-2-amino-1-hydroxybenzene-6-sulphonic acid with the addition of 15 parts of 30% hydrochloric acid are suspended in 200 parts of water and diazotised at 0–5° with 16.6 parts by volume of a 33.3% sodium nitrite solution. The clear diazo solution is neutralised with sodium bicarbonate and poured at 0–5° into a solution of 18.8 parts of 5-acetylamino-2.4-dimethyl-1-hydroxybenzene, 4.2 parts of sodium hydroxide and 12 parts of anhydrous sodium carbonate in 150 parts of water. 100 parts of pyridine are added and the whole is stirred at 0–5° until the dyestuff formation is complete. The reaction is made acid to Congo red paper with hydrochloric acid, the precipitated dyestuff is filtered off and dissolved in hot water by the addition of sodium carbonate. The sodium salt of the dyestuff is precipitated with sodium chloride, filtered off and dried. It is a dark brown powder which is used for the dyeing of wool for example as follows:

100 parts of wool are entered at 40–50° into a dyebath which contains 1.5 parts of the dyestuff, 10 parts of Glaubers salt and 3 parts of 40% acetic acid in 3000 parts of water. The bath is brought to the boil and boiled for half an hour, 1 part of sulphuric acid being added. Then 0.8 part of potassium chromate is added and the bath is boiled for another 40 minutes. A very fast brown dyeing is obtained.

The following Table II contains more examples of monoazo dyestuffs according to the present invention which are produced by the methods described in Example 4 above:

1. A dyestuff selected from the class consisting of the monoazo dyestuffs having the general formula:

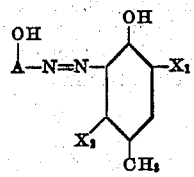

wherein A represents a mononuclear radical of the benzene series bound to the azo group in ortho-position to the hydroxyl group, one X represents a methyl group and the other X represents a lower acylamino group, the chromium complexes of said dyestuffs containing one chromium atom in complex linkage with two molecules of dyestuff, and the cobalt complexes of said dyestuffs containing one cobalt atom in complex linkage with two molecules of dyestuff.

2. A metalliferous compound which contains one atom of a metal selected from the group consisting of cobalt and chromium in complex union with two molecules of a dyestuff which is free from sulphonic acid and carboxylic acid groups of the general formula:

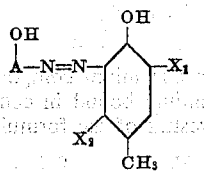

wherein A represents a mononuclear radical of the benzene series bound to the azo group in ortho-position to the hydroxyl group, one X represents a methyl group and the other X represents a lower acylamino group.

3. A metalliferous compound which contains one atom of a metal selected from the group consisting of cobalt

Table II

| No. | Diazo component | Azo component | Metal | Shade on wool |
|---|---|---|---|---|
| 1 | 4-nitro-2-amino-1-hydroxybenzene-6-sulphonic acid. | 2-methane sulphonyl amino-4.5-dimethyl-1-hydroxybenzene. | after chromed. | brown. |
| 2 | ----do---- | 5-ethane sulphonyl amino-2.4-dimethyl-1-hydroxybenzene. | ----do---- | Do. |
| 3 | ----do---- | 2-benzene sulphonyl amino-4.5-dimethyl-1-hydroxybenzene. | ----do---- | Do. |
| 4 | ----do---- | 5-toluene sulphonyl amino-2.4-dimethyl-1-hydroxybenzene. | ----do---- | Do. |
| 5 | ----do---- | 2-benzoylamino-4.5-dimethyl-1-hydroxybenzene. | ----do---- | Do. |
| 6 | ----do---- | 5-benzoylamino-2.4-dimethyl-1-hydroxybenzene. | ----do---- | Do. |
| 7 | ----do---- | 2-ureido-4.5-dimethyl-1-hydroxybenzene. | ----do---- | Do. |
| 8 | ----do---- | 5-ureido-2.4-dimethyl-1-hydroxybenzene. | ----do---- | Do. |
| 9 | ----do---- | 2-acetylamino-4.5-dimethyl-1-hydroxybenzene. | ----do---- | Do. |

EXAMPLE 5

100 parts of wool are entered at 40° into a dyebath which contains in 4000 parts of water, 2 parts of the dyestuff according to Example 1 and 3 parts of ammonium acetate. The bath is brought to the boil within 30 minutes and kept at this temperature until the liquor is practically exhausted, which is for about half an hour. The wool which has been dyed in level brown shades, is rinsed and dried.

The dyestuffs according to Examples 2 and 3 and those in Table I can be dyed in the same manner.

What we claim is:

and chromium in complex union with two molecules of a dyestuff of the general formula:

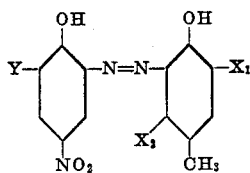

wherein one X represents a methyl group and the other X represents a lower acylamino group, acyl meaning the radical of a lower aliphatic carboxylic acid, and Y represents a member selected from the group consisting of H, Cl and CH₃.

4. A metalliferous compound which contains one atom of a metal selected from the group consisting of cobalt and chromium in complex union with two molecules of a dyestuff of the general formula:

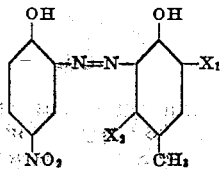

wherein one X represents a methyl group and the other X represents a lower acylamino group, acyl meaning the radical of a lower aliphatic carboxylic acid.

5. The complex chromium compound which contains one atom of chromium bound in complex union to two molecules of a dyestuff of the formula:

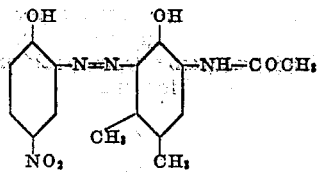

6. The complex chromium compound which contains one atom of chromium bound in complex union to two molecules of a dyestuff of the formula:

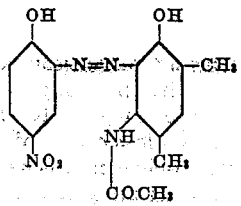

7. The complex cobalt compound which contains one atom of cobalt bound in complex union to two molecules of a dyestuff of the formula:

$$\underset{NO_2}{\underset{|}{\bigcirc}}\overset{OH}{\underset{}{}}-N=N-\underset{CH_3}{\underset{|}{\bigcirc}}\overset{OH}{\underset{CH_3}{}}-NH-COCH_3$$

8. The complex chromium compound which contains one atom of chromium bound in complex union to two molecules of a dyestuff of the formula:

$$\underset{NO_2}{\bigcirc}\overset{OH}{}-N=N-\underset{\underset{CO}{\overset{NH}{|}}}{\bigcirc}\overset{OH}{}-CH_3$$
$$\overset{}{OCH_3}$$

9. The complex cobalt compound which contains one atom of cobalt bound in complex union to two molecules of a dyestuff of the formula:

$$\underset{NO_2}{\bigcirc}\overset{OH}{}-N=N-\underset{\underset{CO}{\overset{NH}{|}}}{\bigcirc}\overset{OH}{}-CH_3$$
$$\overset{}{OCH_3}$$

References Cited in the file of this patent
UNITED STATES PATENTS
2,229,200    Wehrli ------------------ Jan. 21, 1941
2,673,199    Widmer et al. ---------- Mar. 23, 1954